(12) United States Patent
Price et al.

(10) Patent No.: US 11,176,758 B2
(45) Date of Patent: *Nov. 16, 2021

(54) OVERLAYING 3D AUGMENTED REALITY CONTENT ON REAL-WORLD OBJECTS USING IMAGE SEGMENTATION

(71) Applicant: Capital One Services, LLC, McLean, VA (US)

(72) Inventors: Micah Price, Plano, TX (US); Geoffrey Dagley, McKinney, TX (US); Staevan Duckworth, The Colony, TX (US); Qiaochu Tang, The Colony, TX (US); Jason Hoover, Grapevine, TX (US); Stephen Wylie, Carrollton, TX (US); Olalekan Awoyemi, Prosper, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,983

(22) Filed: Dec. 8, 2020

(65) Prior Publication Data

US 2021/0090346 A1 Mar. 25, 2021

Related U.S. Application Data

(63) Continuation of application No. 16/252,869, filed on Jan. 21, 2019, now Pat. No. 10,867,447.

(51) Int. Cl.
*G06T 19/00* (2011.01)
*G06T 7/73* (2017.01)
(Continued)

(52) U.S. Cl.
CPC ........ *G06T 19/006* (2013.01); *G06K 9/00664* (2013.01); *G06T 7/12* (2017.01);
(Continued)

(58) Field of Classification Search
CPC ........... G06T 7/543; G06T 7/564; G06T 7/70; G06T 7/73; G06T 7/75; G06T 19/006
See application file for complete search history.

(56) References Cited

U.S. PATENT DOCUMENTS

2017/0243406 A1* 8/2017 Yamazaki .......... G02B 27/0172
2017/0286750 A1* 10/2017 Levinshtein ......... G06K 9/6202
(Continued)

*Primary Examiner* — Ryan McCulley
(74) *Attorney, Agent, or Firm* — Kacvinsky Daisak Bluni PLLC

(57) ABSTRACT

Various embodiments are generally directed to techniques of overlaying a virtual object on a physical object in augmented reality (AR). A computing device may receive one or more images of the physical object, perform analysis on the images (such as image segmentation) to generate a digital outline, and determine a position and a scale of the physical object based at least in part on the digital outline. The computing device may configure (e.g., rotate, scale) a 3D model of the physical object to match the determined position and scale of the physical object. The computing device may place or overlay a 3D virtual object on the physical object in AR based on a predefined location relation between the 3D virtual object and the 3D model of the physical object, and further, generate a composite view of the placement or overlay.

20 Claims, 8 Drawing Sheets

(51) Int. Cl.
*G06T 7/12* (2017.01)
*G06T 7/60* (2017.01)
*G06T 7/13* (2017.01)
*G06T 17/00* (2006.01)
*G06K 9/00* (2006.01)

(52) U.S. Cl.
CPC ............... *G06T 7/13* (2017.01); *G06T 7/60* (2013.01); *G06T 7/75* (2017.01); *G06T 17/00* (2013.01); *G06T 2207/20081* (2013.01); *G06T 2207/20084* (2013.01); *G06T 2207/20092* (2013.01); *G06T 2207/30252* (2013.01)

(56) References Cited

U.S. PATENT DOCUMENTS

| | | | |
|---|---|---|---|
| 2018/0137651 A1* | 5/2018 | Levinshtein | G06T 7/75 |
| 2018/0233145 A1* | 8/2018 | Bathiche | G06F 1/324 |
| 2018/0336729 A1* | 11/2018 | Prideaux-Ghee | G06F 3/011 |
| 2019/0066328 A1* | 2/2019 | Kwant | G06T 7/75 |
| 2020/0065991 A1* | 2/2020 | Chu | G06T 19/006 |

\* cited by examiner

OVERLAYING 3D AUGMENTED REALITY CONTENT ON REAL-WORLD OBJECTS USING IMAGE SEGMENTATION

CROSS-REFERENCE TO RELATED APPLICATIONS

This application is a continuation of U.S. patent application Ser. No. 16/252,869, entitled "OVERLAYING 3D AUGMENTED REALITY CONTENT ON REAL-WORLD OBJECTS USING IMAGE SEGMENTATION" filed on Jan. 21, 2019. The contents of the aforementioned application are incorporated herein by reference in their entirety.

BACKGROUND

Augmented reality (AR) is an interactive experience of a real-world environment whereby the objects that reside in the real-world are augmented by overlaying computer-generated perceptual information. The overlaid information may be additive to the natural environment.

There are several AR techniques to render virtual images over real-world objects. Simultaneous Localization and Mapping (SLAM) is an AR technique that localizes sensors with respect to their surroundings, while at the same time maps the structure of the environment. Recognition-based (or marker-based) AR uses a camera to identify visual markers or objects to showcase an overlay only when the marker is sensed by the device. Location-based AR relies on GPS, a digital compass, a velocity meter, or an accelerometer to provide data about location, and the AR visualizations are activated based on these inputs.

However, neither the above-described AR techniques nor other known AR techniques allow three-dimensional (3D) virtual objects to be overlaid or lined-up with real-world objects in a precise manner. Accordingly, there is a need for overlaying 3D virtual objects on real-world objects in a highly precise and exact manner when precision and exactness in AR are desirable.

SUMMARY

Various embodiments are generally directed to techniques of overlaying a virtual object on a physical object in AR. A computing device may receive one or more images of the physical object, perform analysis on the images to generate a digital outline of the physical object, and determine a position (e.g., rotation) and a scale of the physical object based at least in part on the generated digital outline. The computing device may configure (e.g., rotate, scale) a 3D model of the physical object to match the determined position and scale of the physical object. The computing device may then place or overlay a 3D virtual object on the physical object in AR based on a predefined locational relation between the 3D virtual object and the 3D model of the physical object, and further, generate a composite view of the 3D virtual object placed or overlaid on the physical object.

The analysis performed to determine the position and scale of the physical object may include performing image segmentation to generate a digital outline of the physical object. In embodiments, a guess-and-check model and/or a machine learning model may be applied to the digital outline to determine the position and scale of the physical object.

DETAILED DESCRIPTION

Figure 1:
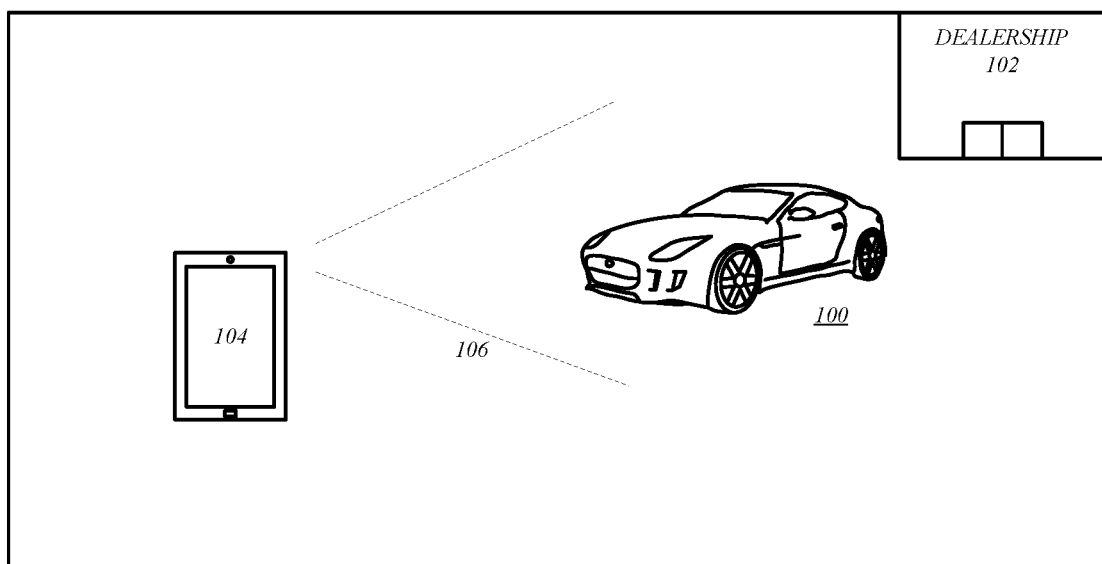
FIG. 1 illustrates an example physical object in accordance with one or more embodiments.

Various embodiments are generally directed to overlaying or superimposing a 3D virtual object onto a physical object in AR in a highly precise manner. In at least that regard, a 3D virtual object can be "snapped-on" or "snapped-into" a physical object in the correct location, which may be particularly desirable for using AR technology on physical objects that are modular in nature, such as a vehicle, a house, etc.

By way of example, the physical object may be a vehicle. A user may be able to preview, in AR, what a vehicle trim (e.g., spoiler) would look like on the vehicle prior to the user installing the trim. For instance, using a computing device (e.g., smartphone, tablet computer, laptop, etc.), a user may be able to view a composite AR rendering of a virtual version of the trim that is "snapped-on" the vehicle in the real-world environment in real time and at its correct location. The user may be able to move the computing device around the vehicle and view the composite AR rendering while the trim continually remains in its correct position irrespective of whether the trim is partially or completely hidden from the current viewpoint.

According to one example, the user may indicate the specific make, model, and/or generation of the vehicle. In a different example, computer vision may be used to predict the make, model, and/or generation of the vehicle. Moreover, the user may specify a trim that the user desires to preview on the vehicle. A 3D model of the vehicle, a virtual version of the trim, and the known correct location of the virtual trim in relation to the 3D model may be provided, generated, accessed, or determined. In examples, the 3D model of the vehicle and the virtual trim may be created ahead of time. Further, the correct location of the virtual trim in relation to the 3D model may be predefined or predetermined.

In embodiments, one or more images of the vehicle in its real-world environment may be received by the computing device in real time. Analysis, such as image segmentation, may be performed on the received images to locate the physical object in the image and generate a digital outline of the vehicle, which may be a two-dimensional (2D) outline of the vehicle. Based on this digital outline, the position (e.g., rotation, spherical coordinates) and the scale of the vehicle in the environment may be determined.

Using the determined position and scale, the 3D model of the vehicle may be configured (e.g., positioned, scaled) correctly. For example, a 2D outline of the 3D model of the vehicle outline may be extracted at a particular rotation and scale, and that 2D outline of the 3D model may be compared to the 2D outline of the vehicle (e.g., the digital outline of the vehicle) to determine whether the two outlines match or align. This configuration process may be repeated until the two outlines are configured to align and may be performed based on or using a trained machine learning model or a directed guess-and-check method. The virtual trim may then be placed, superimposed, or overlaid onto the vehicle in AR based on the predefined locational relation of the virtual trim with respect to the 3D model of the vehicle. Accordingly, the user may be able to preview what the trim looks like on the vehicle with a high degree of reliability and accuracy before the trim is installed.

It may be understood that the term trim is applied broadly and may include any add-on, option, or any suitable modification to the vehicle, as will be further described below. Moreover, while the above-described physical object is a vehicle, it may be understood that the physical object may be any real-world object, particularly objects that are modular, such as a house so that various additions or modifications (e.g., sunroom, new garage, deck) thereon can be previewed in AR.

Previously or currently available AR technology is limited in that the precision and exactness of overlaying virtual add-ons on physical objects is neither an important nor a primary objective. There are, however, various applications of AR technology where precision and exactness are highly desirable. The above-described features and the related embodiments and examples described herein are advantageous over the previously or currently available AR technology. For example, analysis, such as image segmentation, may be performed on images of a physical object to generate an accurate digital outline of the physical object, which then may be used to accurately determine the position (e.g., rotation) and the scale of the physical object by comparing a 2D outline of a 3D model of physical object at particular rotations(s) and scale(s) with the digital outline of the physical object based on a machine learning model and/or a guess-and-check method. By configuring a 3D model of the physical object to match the determined position and scale, a virtual object may be overlaid on or "snapped on" to a physical object in AR based on a known locational relation between the virtual object and the 3D model, thereby allowing high precision in the AR process.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example physical object according to one or more embodiments. As shown, the physical object is a vehicle 100 (e.g., a two-door sports coupe) that may be parked in an inventory lot at a car dealership 102. The vehicle 100 may have a trim level that is most basic, and thus, a user may be able to customize the vehicle 100 with individual trims, various add-ons, modifications, upgrades, trim packages, and the like. By way of example, the trims may include a spoiler, a fog lamp, a headlight, a tail light, a wheel rim, an exhaust pipe, a bumper add-on, paint color, a decal or sticker, a tint shade, etc. Prior to purchasing or installing any trim, the user may desire to preview what the trim would look like on the vehicle. Moreover, if there are different designs or models of the same type of trim, the user may want to see how those different designs and models look like or fit on the vehicle. In a further example, the physical object may be a scale model of a vehicle, such as vehicle 100, that may be displayed in a kiosk, model showroom, or any suitable display structure. Thus, a user may be able to interact with the vehicle represented by the scale model and preview various add-ons, modifications, upgrades, trims, etc. via the AR-based overlay technique described herein and any other applicable computing technology, such as artificial intelligence (AI) technology.

In embodiments, the user may use a computing device 104, such as a smartphone, a tablet computer, a laptop, or any suitable mobile computing device, to place, superimpose, or overlay a virtual version of the trim on the vehicle in AR. As shown, the user may hold up the computing device 104 so that the vehicle 100 is sufficiently within a field-of-view 106 of at least one sensor of the computing device 104. For instance, the sensor may be an image sensor, a camera, an infrared camera, a laser sensor, or any other suitable sensor for capturing images or data related to the physical attributes of the vehicle 100.

Figure 2:
FIG. 2 illustrates an example user interface in accordance with one or more embodiments.

FIG. 2 illustrates an example user interface 200 according to one or more embodiments. The user interface 200 may be displayed on a computing device, which may be similar to the above-described computing device 104. In embodiments, the user may be prompted by the interface 200 to enter the make and model of the vehicle. Based on this user input, the computing device may acquire from a storage device a 3D model of the vehicle, as will be further described below. In the illustrated example, the make of the vehicle may be a Jaguar and the model may be the F-Type Coupe. In alternative embodiments, the computing device may receive one or more images of the vehicle via at least one camera, and computer vision processing may be performed to predict the make and model of the vehicle. Moreover, the one or more images of the vehicle may be input to an image classifier to determine the make and model. Upon determination of the make and model, the interface 200 may also prompt the user for confirmation.

The interface 200 may display various trims that may be superimposed on the vehicle in AR. As illustrated, the trims include two different models of a spoiler (spoiler M1 and spoiler M2), three different designs of a wheel rim (wheel rim D1, wheel rim D2, and wheel rim D3), a tail light, a paint color, a bumper add-on, a rear bumper add-on, a tint shade, an exhaust pipe, a headlight, a fog lamp, a decal or sticker. In embodiments, the user may be able to press any lettering portion of each trim (or hover a cursor over the lettering portion) to view an image, or a virtual version, of the trim. The user may select one or more of the trims by pressing the respective square icon on the left. As shown in FIG. 2, the user may select three different trims to place, superimpose, or overlay on the vehicle: the spoiler M1, the wheel rim D2, and the bumper add-on.

Figure 3:
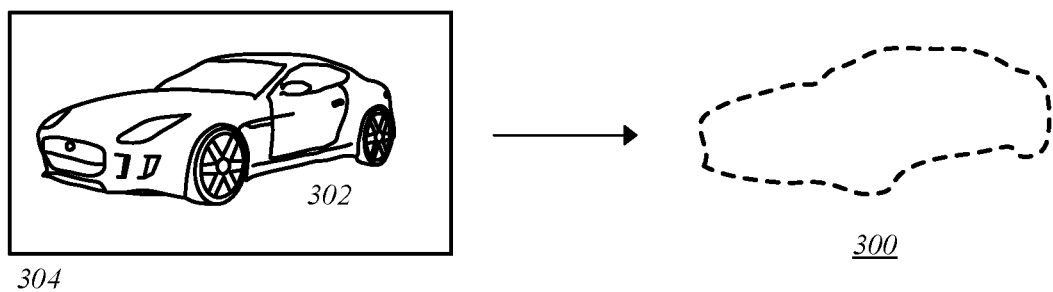
FIG. 3 illustrates an example digital outline of a physical object in accordance with one or more embodiments.

FIG. 3 illustrates an example digital outline 300 of a physical object according to one or more embodiments. As shown, the physical object may be a vehicle 302, which may be similar to the vehicle 100 of FIG. 1. In examples, a computing device may receive one or more images, e.g., image 304, of the vehicle 302 via at least one camera. Alternatively, one or more frames from a video feed of the vehicle may be received. Using the one or more images, or the one or more frames, a digital (e.g., pixel-level) outline of the vehicle may be generated by performing analysis on the images or the frames.

By way of example, the performed analysis may be image segmentation, which is a computer-vision-based process of partitioning a digital image into multiple segments (e.g., pixels, super-pixels) and used to locate objects and boundaries (e.g., lines, curves, etc.) in the image, whereby a label to every pixel may be assigned such that pixels with the same label may share certain characteristics. There are numerous image segmentation methods: thresholding methods, clustering methods, motion and interactive segmentation, compression-based methods, histogram-based methods, dual clustering method, region-growing methods, partial differential equation-based methods, variational methods, graph partitioning methods, watershed transformation, model-based segmentation, multi-scale segmentation, semi-automatic segmentation, trainable segmentation, segmentation of related images and videos, etc. One or more of these methods may be used herein. Moreover, performing image segmentation on the images or frames may include applying a convolutional neural network (CNN) learning algorithm (e.g., DeepLabV3, U-net) on the one or more images or the one or more frames, where a predetermined number of samples may be used to train the CNN learning algorithm.

In further embodiments, the digital outline 300 may be a pixelated or super-pixelated boundary of the vehicle 302 and may be generated using an edge detection method via an edge detector. For example, edge detection may include various mathematical methods that identify points in a digital image at which the image brightness changes sharply or has discontinuities. It may be understood that the digital outline 300 is a 2D outline of the vehicle 302.

Figure 4:
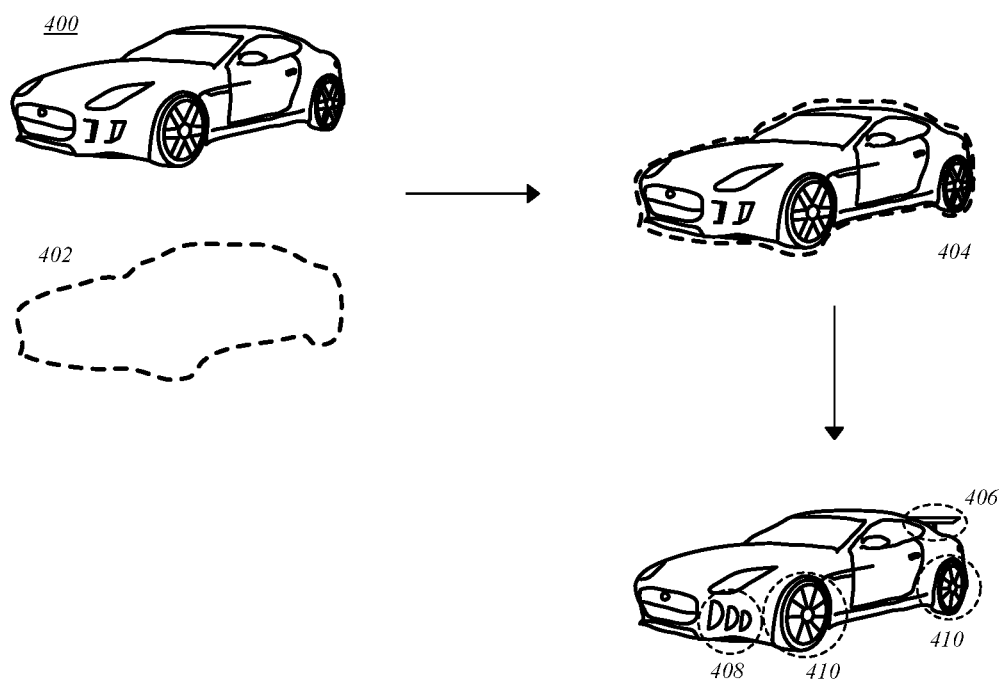
FIG. 4 illustrates configuring an example three-dimensional model of a physical object in accordance with one or more embodiments.

FIG. 4 illustrates configuring an example 3D model 400 of a physical object according to one or more embodiments. The physical object, again, may be a vehicle and the 3D model 400 of the vehicle may be provided, generated, accessed, or determined. As shown, the 3D model 400 may be an exact virtual replica of the vehicle. It may include all the basic components, details, and trims found in the original vehicle. In examples, the 3D model 400 may be created ahead or time, and thus, provided to a computing device or accessed by the computing device. In alternative examples, the 3D model 400 may be determined or generated on-the-fly and in real-time using various types of information and data corresponding to the vehicle, e.g., images of the vehicle, publicly available data or information on the Internet, etc.

A digital outline 402 of the vehicle, which may be similar to the above-described digital outline 300, may be used to determine the position and the scale of the vehicle in the image or frame. In embodiments, the determination of the position and scale of the vehicle may include using or applying an object-specific machine learning model, which may include tree-based methods (e.g., random forest, gradient boosted machine (GBM), Classification And Regression Trees (CART)), linear or logistic regression, neural network, support vector machines (SVM), etc. that may be trained on an outline of the 3D model 400 at numerous rotations and/or scales to the generated digital outline 402 of the vehicle to accurately predict the position and scale. It may be understood that the machine learning model may be a general "one size fits all" model that predicts rotation and/or scale based on a 3D object and a 2D outline and is not required to be object-specific. In another embodiment, the determination of the position and scale of the vehicle may include applying a guess-and-check model that compares the outline of the 3D model 400 at numerous rotations and/or scales for a predetermined number of guesses and checks. In at least that regard, in one or both of the above-described embodiments, a 2D outline of the 3D model 400 in a particular rotation and scale may be extracted, and that 2D outline of the 3D model may be compared to the 2D outline of the vehicle (e.g., the digital outline 402) to determine, or until it is determined, that the two outlines match or align. It may be understood that the term position may be broad and include information on the rotation (e.g., yaw, pitch) of the vehicle as well as spherical coordinates (e.g., radial distance, polar angle, azimuthal angle) associated with the vehicle.

Once the specific position and scale of the vehicle are determined, the 3D model 400 may be configured to match the position and scale of the vehicle by correctly positioning, rotating, and scaling the 3D model 400 of the vehicle. To at least that end, the result 404 of the configuration process may be that the 3D model 400 of the vehicle precisely aligns with the digital outline 402, as shown. It may be understood that the outlines of the 3D model 400 and the digital outline 402 may not line up pixel-perfect. Thus, the outlines may be considered to match or aligned when a desired or predetermined threshold match or alignment is achieved (e.g., to an acceptable or predetermined threshold of error). The determination of whether the outlines match or align may be applied similarly to the guess-and-check method in that the next guess may be selected based on the error (e.g., outline mismatch) of one or more previous guesses.

Upon at least correctly positioning and scaling the 3D model 400, a virtual trim (or trims) may be placed, superimposed, or overlaid on the vehicle in the correct location(s). The correct location of the virtual trim in relation to the 3D model 400 (which may otherwise be known as the locational relationship between the virtual trim and the 3D model 400) may be predefined or predetermined. In other words, for instance, it may already be known exactly where on the vehicle the trim is positioned, and based on this known association, the virtual trim may be easily and correctly placed on the 3D model 400. Thus, for example, and as shown, the specific trims selected by the user in FIG. 2—the spoiler M1, the bumper add-on, and the wheel rim D2—may be correctly and precisely placed, superimposed, or overlaid on the vehicle at positions 406, 408, and 410, respectively.

Moreover, a plane detection with respect to a floor may be performed to determine the correct location of the virtual trim on the vehicle. By way of example, various feature points on the floor may be used to calculate the location of the virtual trim, which may be based on knowing the position and other location information of the 3D model 400 relative to a virtual floor that corresponds to the physical floor.

It may be understood in scenarios where physical objects are rotationally symmetric (e.g., vertical symmetry of a vehicle—the front and back of the vehicle would look the same from a dead-center viewpoint), mismatches between the 3D model of the physical object and the digital outline may occur. Thus, in these scenarios, multiple images or frames may be analyzed to ensure there is no mismatch and/or the user may be prompted to not point the computing device or look at the physical object directly from the line of symmetry. Further, it may be understood that while only a single image or frame may be used to determine the position and scale of the vehicle, and overlay a virtual trim thereon, it may be more robust to analyze multiple images or frames, especially as the user moves the computing device around the vehicle, which would produce numerous different digital outlines, positions, rotations, and/or scales of the vehicle. Once the virtual trim is correctly placed on the vehicle, one or more images or frames may be periodically checked to verify that the position and scale of the real-world vehicle still align with the 3D model of the vehicle.

Figure 5:
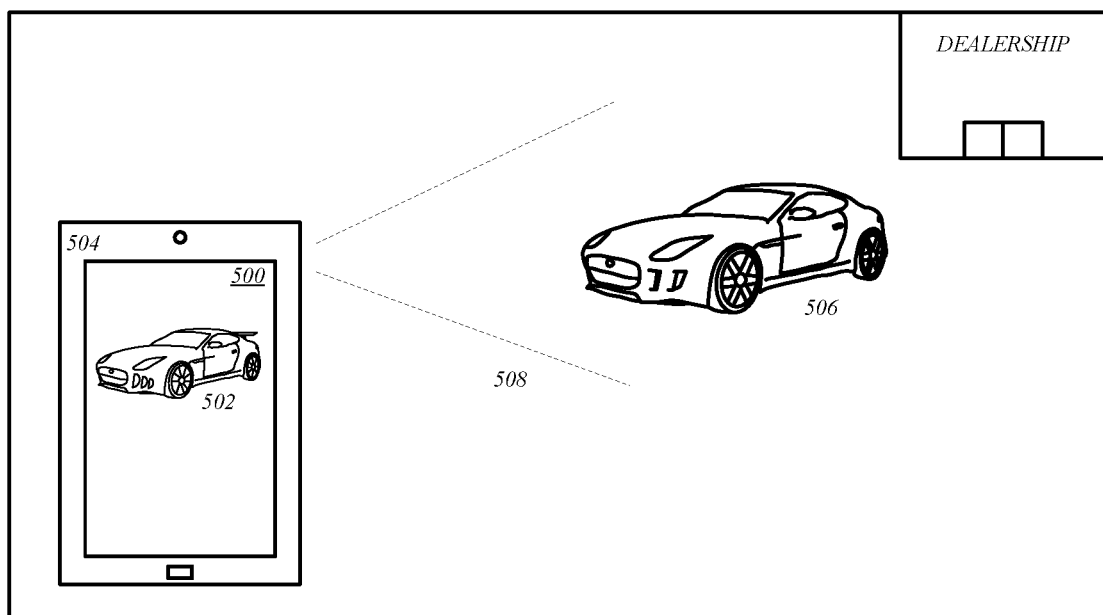
FIG. 5 illustrates an example composite view in accordance with one or more embodiments.

FIG. 5 illustrates an example composite view 500 according to one or more embodiments. As shown, a computing device 504 displays the composite view 500 of the virtual trims (e.g., the trims selected by the user in FIG. 2—the spoiler M1, the bumper add-on, and the wheel rim D2) that are placed, superimposed, or overlaid on a vehicle 506 in AR to generate an AR-modified vehicle 502. In this regard, the user can preview what the selected trims will look like on the vehicle 506 in real time via the AR-modified vehicle 502 prior to purchasing or installing the trims. The composite view 500 may be generated from a camera-end of a field-of-view 508.

In embodiments, the interface of the computing device 504 may allow the user to add or remove trims or other options while simultaneously viewing the AR-modified vehicle 502 in the composite view 500. For instance, the user may decide to change the paint color of the vehicle in real time. The computing device 504 may then automatically update the paint color such that the AR-modified vehicle 502 shows the new paint color selected by the user in the composite view 500.

In examples, the user may walk around the vehicle with the computing device 504 to view the AR-modified vehicle 502 at different angles or positions. Thus, for instance, at least the position, rotation, scale, etc. of the 3D model of the vehicle may be continuously updated so that the virtual trims remain in the correct locations on the AR-modified vehicle 502 as the computing device is moved around. Moreover, the virtual trims may be placed, superimposed, or overlaid on the vehicle 506 irrespective of whether any of the virtual trims are partially or completely visible in the relevant field-of-view. As shown in FIG. 5, for instance, the spoiler is partially visible on the AR-modified vehicle 502 when in the field-of-view 508. This feature is advantageous and desirable because it allows the user to see what the spoiler looks like from that viewpoint despite the spoiler being partially hidden.

It may be understood that the above-described features and techniques for overlaying virtual objects in a precise and exact manner may be applied to any real-world object, particularly objects that are modular in nature, for example, previewing renovation-related add-ons for a house. Other examples may also include interior design, construction, engineering applications, gaming, etc.

Figure 6:
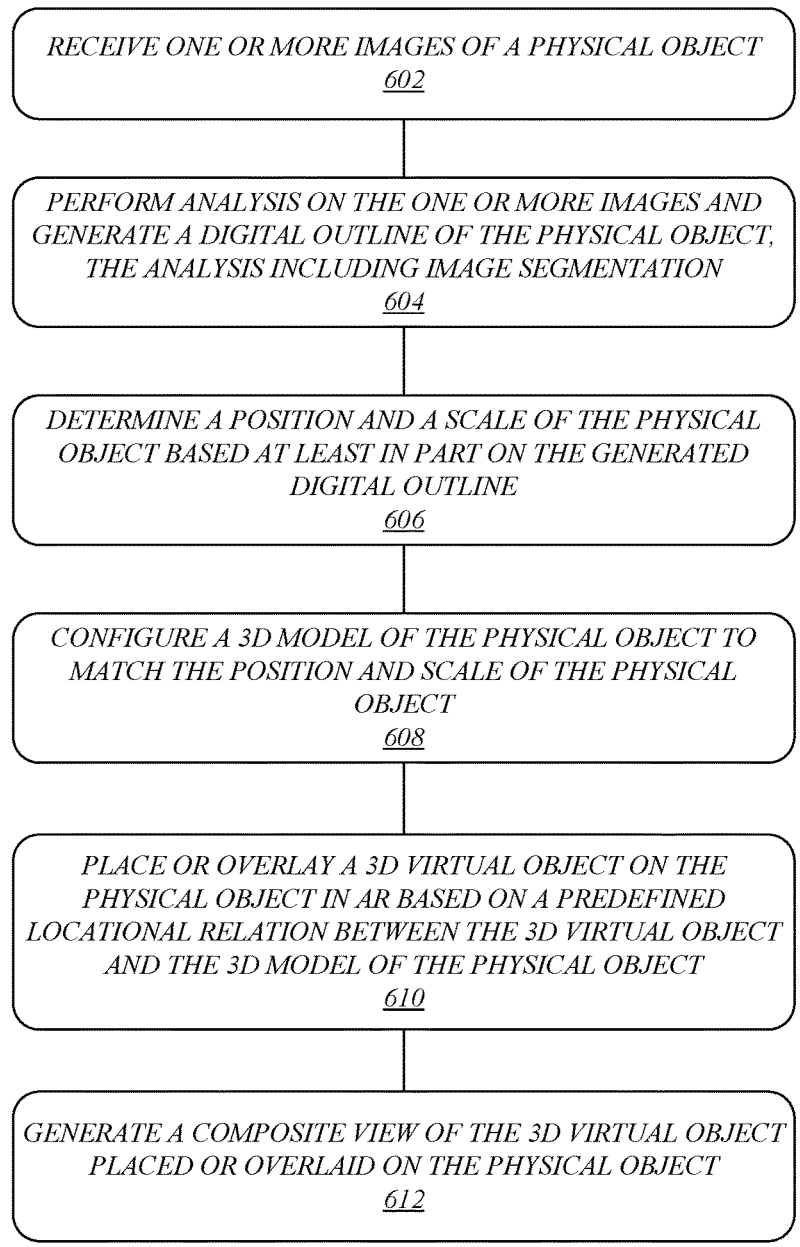
FIG. 6 illustrates an example flow diagram in accordance with one or more embodiments.

FIG. 6 illustrates a flow diagram 600 in accordance with one or more embodiments. It may be understood that the features associated with the illustrated blocks may be performed or executed by one or more computing devices and/or processing circuitry contained therein.

At block 602, one or more images of a physical object may be received. The physical object may be any real-world object, such as a vehicle, a house, a boat, an airplane, etc. As described above, the one or more images may be captured by a camera or any suitable imaging device coupled to a computing device. For instance, a user may hold up the camera and take pictures or a video of the physical object.

At block 604, an analysis is performed on the one or more images to generate a digital outline of the physical object. As set forth above, the analysis may include performing image segmentation. Additionally, or alternatively, the analysis may include performing an edge detection via an edge detector to generate a pixelated or super-pixelated outline of the object. The digital outline may be a 2D outline of the physical object.

At block 606, based on the generated digital outline of the physical object, a position and a scale of the object may be determined or predicted, which may be based on different techniques. For example, a 3D model of the physical object, which may have been created beforehand, may be provided, accessed, or generated. A machine learning model that is trained on an outline of the 3D model of the object at one or more different rotations and/or scales may be applied to the digital outline generated at block 604. The machine learning model may then accurately predict the position and scale of the physical object. The machine learning model may include tree-based methods (e.g., random forest, gradient boosted machine (GBM), Classification And Regression Trees (CART)), linear or logistic regression, neural network, support vector machines (SVM), etc. In another example, a guess-and-check model may be employed, which compares the outline of the 3D model of the physical object at different rotations and scales for a predetermined number of guesses and/or checks, and subsequently predicts or determines the position and scale of the physical object once the guess-and-check model achieves a desired result. In either or both examples, as set forth above, the 2D outline of the 3D model of the physical object in a particular rotation and scale may be extracted, and that 2D outline of the 3D model may be compared to the 2D outline of the physical object (e.g., the digital outline generated at block 606).

At block 608, the 3D model of the physical object may be configured, e.g., positioned, rotated, scaled, etc., to match the determined position and scale at block 606. The configuration of the 3D model allows a 3D virtual object, such as a vehicle trim or an addition to a house, to be correctly placed, superimposed, or overlaid on the physical object.

At block 610, the virtual object is placed or overlaid, or "snapped," on the physical object in AR based on a known locational relation between the 3D virtual object and the 3D model of the physical object. In embodiments, the 3D model of the physical object and all relevant or possible virtual add-ons may be created beforehand, which provides the blueprint for correctly placing a virtual object on the physical object in AR in real time.

At block 612, a composite view may be digitally rendered or generated, which includes the 3D virtual object correctly and accurately placed or overlaid on the physical object. It may be understood that the process described in blocks 602 to 612 may be repeated for every image or video frame the computing device receives, thereby providing a continuous, updated real-time preview of the 3D virtual object in AR even as the computing device is moving around the physical object.

It may be understood that the blocks illustrated in FIG. 6 are not limited to any specific order. One or more of the blocks may be performed or executed simultaneously or near simultaneously. For example, the hashing and salting of the key may be performed at the same time.

Figure 7:
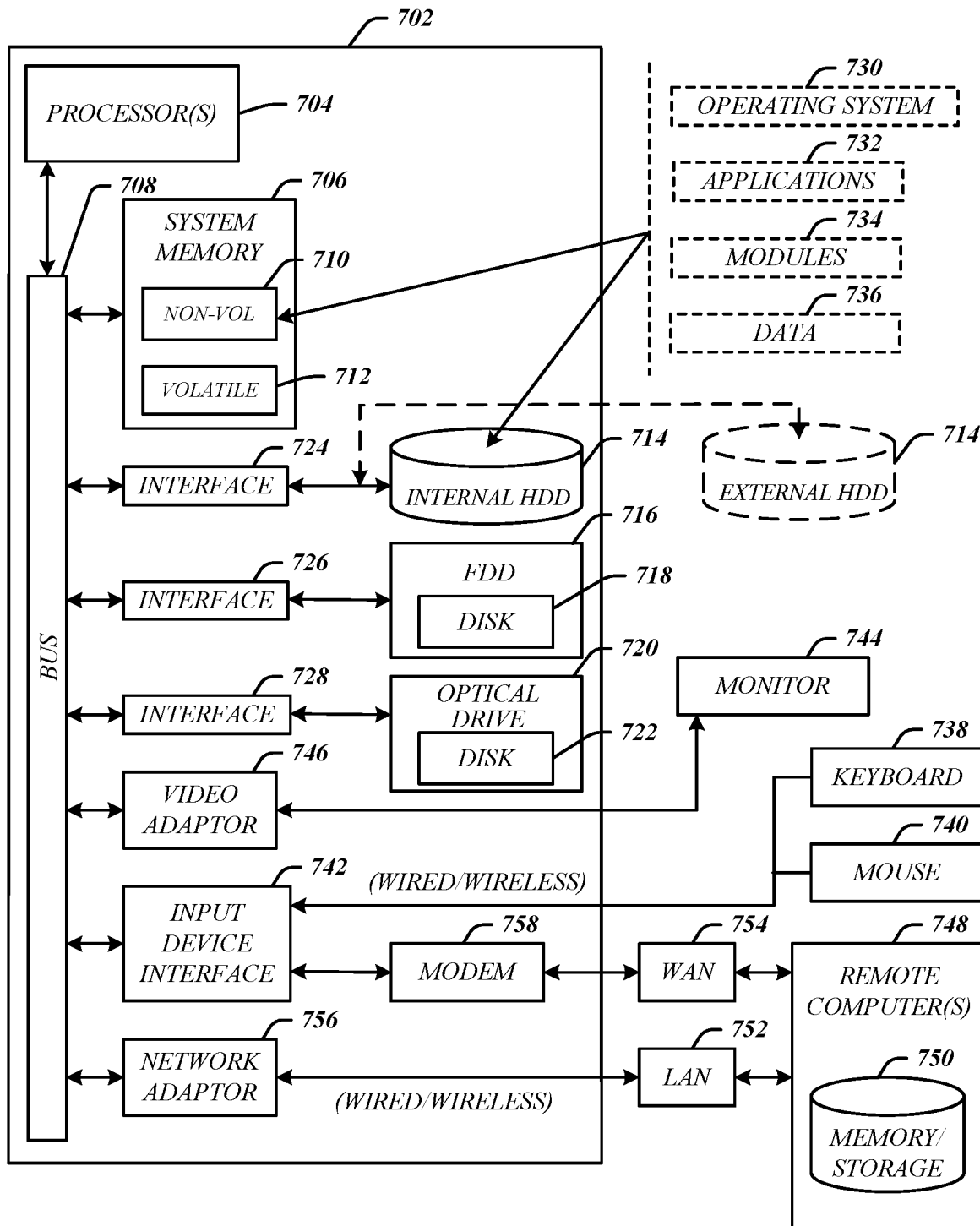
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. The computing device may be the computing devices 104, 200, and 504 illustrated in FIGS. 1, 2 and 5, respectively. In one embodiment, the computing architecture 700 may include or be implemented as part of a system, which will be further described below. As described above, at least one computing device and/or the processing circuitries thereof may be configured to at least receive one or more images (or frames of a video feed) of a physical object via at least one camera (which may be coupled to or integrated in the computing device) to perform analysis (e.g., image segmentation) on the images, and further determine the position and scale of the physical object to overlay a virtual object on the physical object at the correct location.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
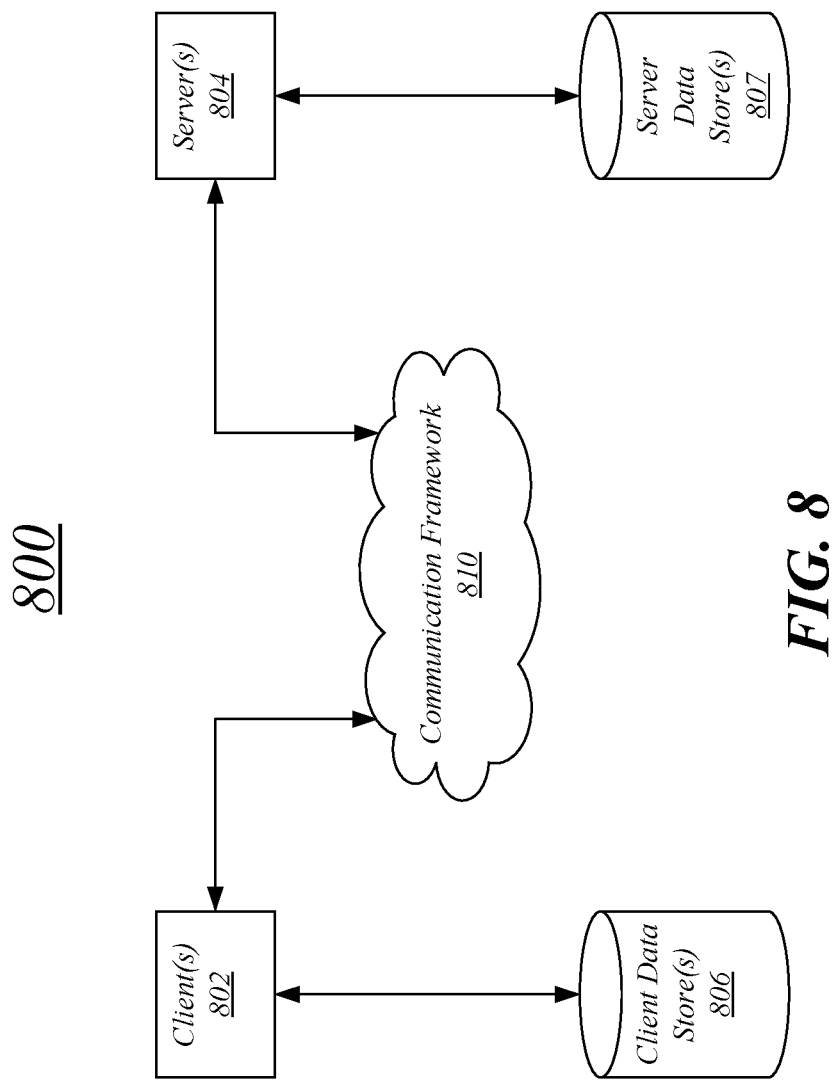
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least one computing devices connected to the network may be a user computing device, such as a desktop computer, laptop, tablet computer, smartphone, etc. (e.g., computing devices 104, 200, and 504 illustrated in FIGS. 1, 2 and 5, respectively). At least a second computing device connected to the network may be one or more back-end server computers. In some embodiments, the user computing device may be configured to send the server computers one or more images for performing the overlay of virtual objects in AR and providing a digital composite view back to the user computing device.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information. By way of example, server data store 807 may store all hashed and salted biometric keys.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium storing computer-readable program code executable by at least one processor to:

perform analysis on one or more images of a physical object from a viewpoint;

determine a position and a scale of the physical object based at least in part on the performed analysis;

configure a 3D model of the physical object to match the position and the scale of the physical object by at least determining whether there is a symmetry-based mismatch between the 3D model and a digital outline of the physical object at the viewpoint based on the performed analysis or additional analysis of the one or more images, the symmetry-based mismatch being caused by at least two possible matches between the 3D model and the digital outline due to one or more symmetrical characteristics of the physical object;

overlay a 3D virtual object at a correct location on an exterior portion of the physical object in augmented reality based on a predefined locational relation between the 3D virtual object and the 3D model of the physical object; and generate and display a composite view of the 3D virtual object overlaid on the exterior portion of the physical object even when the 3D virtual object is partially hidden from view by the physical object at the viewpoint, the 3D virtual object being an exterior object and a portion of the 3D virtual object being omitted from display based on the portion of the 3D virtual object being obstructed by the physical object at the viewpoint.

2. The at least one non-transitory computer-readable storage medium of claim 1, wherein the determination of the position and the scale of the physical object comprises the computer-readable program code to cause the at least one processor to:

apply a machine learning model to the digital outline, wherein the machine learning model is trained on a two-dimensional (2D) outline of a three-dimensional (3D) model of the physical object at a plurality of rotations, and wherein the application of the machine learning model comprises: (i) extracting the 2D outline of the 3D model at each of the plurality of rotations, (ii) comparing the 2D outline of the 3D model to the digital outline of the physical object, and (iii) determining whether the 2D outline and the digital outline matches or aligns based on the comparison.

3. The at least one non-transitory computer-readable storage medium of claim 1, wherein the determination of the position and the scale of the physical object comprises the computer-readable program code to cause the at least one processor to:

apply a guess-and-check model to the digital outline, wherein the guess-and-check model compares a two-dimensional (2D) outline of a three-dimensional (3D) model of the physical object at a plurality of rotations for a predefined number of guesses and checks, and wherein the application of the guess-and-check model comprises: (i) extracting the 2D outline of the 3D model at each of the plurality of rotations, (ii) comparing the 2D outline of the 3D model to the digital outline of the physical object, and (iii) determining whether the 2D outline and the digital outline matches or aligns based on the comparison.

4. The at least one non-transitory computer-readable storage medium of claim 1, wherein the predefined locational relation defines where the 3D virtual object belongs on the 3D model, and wherein the predefined locational relation between the 3D virtual object and the 3D model of the physical object is based on a physical locational relation between a physical add-on object and the physical object.

5. The at least one non-transitory computer-readable storage medium of claim 1, wherein the analysis performed on the one or more images of the physical object comprises the computer-readable program code to cause the at least one processor to:

perform an image segmentation on the one or more images to locate the physical object in the one or more images and determine the digital outline, and wherein the digital outline of the physical object is a pixelated or super-pixelated boundary of the physical object and is generated via at least an edge detector.

6. The at least one non-transitory computer-readable storage medium of claim 1, wherein the computer-readable program code further causes the at least one processor to:

perform a plane detection of a floor in the one or more images, and wherein the determination of at least the position of the physical object is based at least in part on one or more feature points on the floor and a location of the 3D model of the physical object relative to a virtual floor corresponding to the floor.

7. The at least one non-transitory computer-readable storage medium of claim 1, wherein the computer-readable program code further causes the at least one processor to:

receive additional images of the physical object; and determine whether the 3D model of the physical object continues to match or line up with the physical object based on the received additional images.

8. A method comprising:

performing, via one or more processors, analysis on one or more images of a physical object from a viewpoint;

determining, via the one or more processors, a position and a scale of the physical object based at least in part on the performed analysis;

configuring, via the one or more processors, a 3D model of the physical object to match the position and the scale of the physical object by at least determining whether there is a symmetry-based mismatch between the 3D model and a digital outline of the physical object at the viewpoint based on the performed analysis or additional analysis of the one or more images, the symmetry-based mismatch being caused by at least two possible matches between the 3D model and the digital outline due to one or more symmetrical characteristics of the physical object;

overlaying, via the one or more processors, a 3D virtual object at a correct location on an exterior portion of the physical object in augmented reality based on a predefined locational relation between the 3D virtual object and the 3D model of the physical object; and generating and displaying a composite view of the 3D virtual object overlaid on the exterior portion of the physical object even when the 3D virtual object is partially hidden from view by the physical object at the viewpoint, the 3D virtual object being an exterior object and a portion of the 3D virtual object being omitted from display based on the portion of the 3D virtual object being obstructed by the physical object at the viewpoint.

9. The method of claim 8, wherein the determining of the position and the scale of the physical object comprises:

applying, via the one or more processors, a machine learning model to the digital outline, wherein the machine learning model is trained on a two-dimensional (2D) outline of a three-dimensional (3D) model of the physical object at a plurality of rotations, and wherein the applying of the machine learning model comprises: (i) extracting the 2D outline of the 3D model at each of the plurality of rotations, (ii) comparing the 2D outline of the 3D model to the digital outline of the physical object, and (iii) determining whether the 2D outline and the digital outline matches or aligns based on the comparison.

10. The method of claim 8, wherein the determining of the position and the scale of the physical object comprises:

applying, via the one or more processors, a guess-and-check model to the digital outline, wherein the guess-and-check model compares a two-dimensional (2D) outline of a three-dimensional (3D) model of the physical object at a plurality of rotations for a predefined number of guesses and checks, and wherein the applying of the guess-and-check model comprises: (i) extracting the 2D outline of the 3D model at each of the plurality of rotations, (ii) comparing the 2D outline of the 3D model to the digital outline of the physical object, and (iii) determining whether the 2D outline and the digital outline matches or aligns based on the comparison.

11. The method of claim 8, wherein the predefined locational relation defines where the 3D virtual object belongs on the 3D model, and wherein the predefined locational relation between the 3D virtual object and the 3D model of the physical object is based on a physical locational relation between a physical add-on object and the physical object.

12. The method of claim 8, wherein the analysis performed on the one or more images of the physical object comprises:

performing, via the one or more processors, an image segmentation on the one or more images to locate the physical object in the one or more images and determine the digital outline, and wherein the digital outline of the physical object is a pixelated or super-pixelated boundary of the physical object and is generated via at least an edge detector.

13. The method of claim 8, further comprising:

performing, via the one or more processors, a plane detection of a floor in the one or more images, and wherein the determining of at least the position of the physical object is based at least in part on one or more feature points on the floor and a location of the 3D model of the physical object relative to a virtual floor corresponding to the floor.

14. The method of claim 8, further comprising:

receiving additional images of the physical object; and determining, via the one or more processors, whether the 3D model of the physical object continues to match or line up with the physical object based on the received additional images.

15. An apparatus comprising:

at least one processor operable to execute stored instructions that, when executed, cause the at least one processor to:

perform analysis on one or more images of a physical object from a viewpoint;

determine a position and a scale of the physical object based at least in part on the performed analysis;

configure a 3D model of the physical object to match the position and the scale of the physical object by at least determining whether there is a symmetry-based mismatch between the 3D model and a digital outline of the physical object at the viewpoint based on the performed analysis or additional analysis of the one or more images, the symmetry-based mismatch being caused by at least two possible matches between the 3D model and the digital outline due to one or more symmetrical characteristics of the physical object;

overlay a 3D virtual object at a correct location on an exterior portion of the physical object in augmented reality based on a predefined locational relation between the 3D virtual object and the 3D model of the physical object; and generate and display a composite view of the 3D virtual object overlaid on the exterior portion of the physical object even when the 3D virtual object is partially hidden from view by the physical object at the viewpoint, the 3D virtual object being an exterior object and a portion of the 3D virtual object being omitted from display based on the portion of the 3D virtual object being obstructed by the physical object at the viewpoint.

16. The apparatus of claim 15, wherein the determination of the position and the scale of the physical object comprises the at least one processor to:

apply a machine learning model to the digital outline, wherein the machine learning model is trained on a two-dimensional (2D) outline of a three-dimensional (3D) model of the physical object at a plurality of rotations, and wherein the application of the machine learning model comprises: (i) extracting the 2D outline of the 3D model at each of the plurality of rotations, (ii) comparing the 2D outline of the 3D model to the digital outline of the physical object, and (iii) determining whether the 2D outline and the digital outline matches or aligns based on the comparison.

17. The apparatus of claim 15, wherein the determination of the position and the scale of the physical object comprises the at least one processor to:

apply a guess-and-check model to the digital outline, wherein the guess-and-check model compares a two-dimensional (2D) outline of a three-dimensional (3D) model of the physical object at a plurality of rotations for a predefined number of guesses and checks, and wherein the application of the guess-and-check model comprises: (i) extracting the 2D outline of the 3D model at each of the plurality of rotations, (ii) comparing the 2D outline of the 3D model to the digital outline of the physical object, and (iii) determining whether the 2D outline and the digital outline matches or aligns based on the comparison.

18. The apparatus of claim 15, wherein the predefined locational relation defines where the 3D virtual object belongs on the 3D model, and wherein the predefined locational relation between the 3D virtual object and the 3D model of the physical object is based on a physical locational relation between a physical add-on object and the physical object.

19. The apparatus of claim 15, wherein the analysis performed on the one or more images of the physical object comprises the at least one processor to:

perform an image segmentation on the one or more images to locate the physical object in the one or more images and determine the digital outline, and wherein the digital outline of the physical object is a pixelated or super-pixelated boundary of the physical object and is generated via at least an edge detector.

20. The apparatus of claim 15, wherein the at least one processor is further caused to:
perform a plane detection of a floor in the one or more images, and
wherein the determination of at least the position of the physical object is based at least in part on one or more feature points on the floor and a location of the 3D model of the physical object relative to a virtual floor corresponding to the floor.

* * * * *